United States Patent [19]
Okumura et al.

[11] 3,839,205
[45] Oct. 1, 1974

[54] CHROMATOGRAPHIC ELEMENT AND METHOD FOR PRODUCING THE SAME

[75] Inventors: Tamotsu Okumura, Toyonaka; Tetsuro Kadono, Neyagawa, both of Japan

[73] Assignee: Shionogi & Co. Ltd., Osaka, Japan

[22] Filed: Sept. 7, 1972

[21] Appl. No.: 287,036

[30] Foreign Application Priority Data
Sept. 8, 1971    Japan.............................. 46-69416

[52] U.S. Cl.............................. 210/198 C, 55/386
[51] Int. Cl............................................ B01d 15/08
[58] Field of Search......... 210/31 C, 198 C; 55/386, 55/67, 197

[56] References Cited
UNITED STATES PATENTS
3,005,514   10/1961   Cole et al. ............................ 55/386
3,418,152   12/1968   Staudenmayer et al. ......... 210/31 C Primary Examiner—John Adee
Attorney, Agent, or Firm—Stewart & Kolasch, Ltd.

[57] ABSTRACT

A chromatographic element composed of a thin rod of refractory and chemically-stable materials covered with a porous sintered layer of finely divided or powdered glass containing fine particles of a chromatographically-active inorganic adsorbent within the porous structure of powdered glass is made by coating said thin rod with a slurry including said powdered glass and absorbent and baking said coated thin rod at a temperature at which the glass begins to melt until the glass becomes sticky and the particles thereof adhere to one another and to the thin rod support. The element has an excellent chromatographic activity even after repeated adsorptions, intense heatings by means of, for instance a hydrogen flame and regenerations by means of, for example, corrosive reagents. It can be handled easily in the same manner as conventional glass implements.

4 Claims, 3 Drawing Figures

PATENTED OCT 1 1974 3,839,205

CHROMATOGRAPHIC ELEMENT AND METHOD FOR PRODUCING THE SAME

BACKGROUND OF THE INVENTION

1. Field of the Invention

The present invention generally relates to a novel chromatographic element which can be employed in stick chromatography, or in rod thin-layer chromatography (Rod TLC), and to a method of producing such an element. In one of its aspects, it relates to a highly coherent chromatographic element, having a layer of excellent porosity sintered around a thin rod of refractory and chemically-stable materials. Moreover, the porous layer provided by the invention constitutes an improvement in the art of chromatography since this element, which has an excellent durability, may easily be handled in the same manner as conventional glass implements, thereby obviating the need for the troublesome operation of building a chromatographic stick.

The stick or rod thin-layer chromatography technique has various advantages in that it does not require any special instrument in the application of the adsorbent and in the development of the choromatogram, it does not choose or reject any developing solvent such as ordinary thin-layer chromatography and it only requires a very small amount of the sample and/or solvent. In addition to these factors, this technique of chromatography is advantageous in that, the chromogenic identification or visualization of the chromatogram is very easy because it may be performed by a simple soaking step, the extraction of the developed sample is easy in that it may be carried out by means of simple cutting, the equipment can be stored conveniently because of its small space occupation and the chromatographic element has a high physical strength.

Moreover, it is regarded as useful and hopeful in the field of quantitative analysis of lipids, medicines and metabolic products which have once been subjected to changes in a living body. Various applications for the TLC-FID (Flame Ionization Detection of Thin-layer Chromatogram) method have recently been proposed. Being different from the TLD (Direct Densitometry of Thin-Layer Chromatogram) method, this TLC-FID method does not suffer from a drift due to the background noise and its sensitivity of detection is of the nanogram ($10^{-9}$ g) order, which is equal to that of the ECD (Electron Capture Detection) method in the Gas-Liquid Chromatography method. It further enables analyses of thermically-unstable compounds, and of substances having very high boiling temperatures, which are difficult to vaporize into the input of equipment used in Gas-Liquid Chromatography, for instance, polar compounds such as amino acids, sugars and steroids.

2. Description of the Prior Art

As previously described, although the stick or rod thin-layer chromatography method itself is a very excellent method of analysis, a method of producing the chromatographic elements utilized in this method has hitherto been usually performed by hand in a laboratory, which includes applying a layer of an adsorbent such as silica gel or alumina around a rod usually made of glass materials. It, however, is very difficult to obtain a uniform and homogeneous thin-layer of the adsorbent and a sufficient reproducibility of the experimental result because such a delicate manipulation often requires special skills of the person who prepares the element. The personal skill of the operator inevitably affects the performance of the element and therefore the precision of the separation. Moreover, the thin-layer adsorbent is very fragile and requires very discrete handlings.

In addition to these factors, a chromatographic element which contains as an adhesive agent an organic substance such as starch, polyvinyl alcohol or polyacrylamide has a drawback in that it cannot withstand intense heating by means of a hydrogen flame or a thermal visualization process with a corrosive reagent such as sulfuric acid, nitric acid or dichromate-sulfuric acid, which are non-selective agents and may usually be used in a chromogenic visualization operation. Namely, such an element cannot detect the chromatogram of a colorless substance by the charring of the background with the corrosive reagents.

Although an element which employs gypsum as the adhesive agent, on the other hand, is refractory and can withstand the high temperature of the hydrogen flame used in the FID method, it is apparently impossible to detect compounds which form a sulfate or a calcium salt with such an element.

SUMMARY OF THE INVENTION

It is therefore the primary object of the present invention to provide a chromatographic element, in the use of which the aforesaid various problems are extensively overcome, and which has the handling ease of an ordinary glass implement and, furthermore, possesses outstanding resistance and chemical stability.

It is another object of the present invention to provide a chromatographic element which can be readily employed in developing procedures and which can easily be adapted to various kinds of instrumentation.

It is a further object of the present invention to provide a chromatographic element having an outstanding durability against the high temperature of a hydrogen flame and which can be regenerated for repeated uses, including treatment with corrosive agents.

These and other objects of the present invention and attendant advantages thereof will be apparent to those who are skilled in the art to which the present invention pertains from a consideration of the detailed disclosure in the specification and the appended claims, taken in conjunction with the accompanying drawing, wherein:

Figure 1:
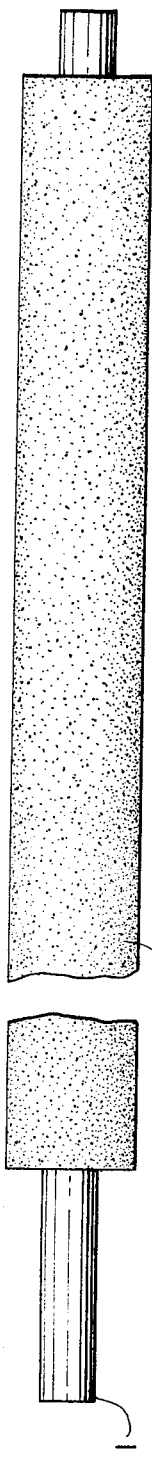
FIG. 1 is a side view of the chromatographic element of the present invention.
Figure 2:
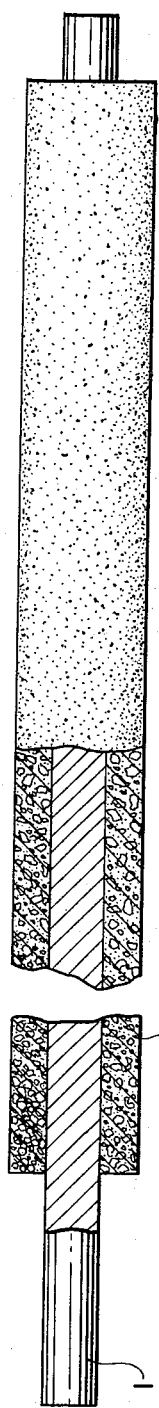
FIG. 2 is a sectional side view of said chromatographic element.
Figure 3:
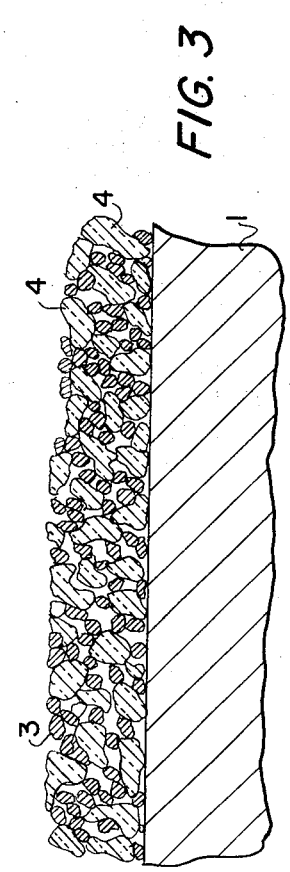
FIG. 3 is an enlarged sectional view of said chromatographic element.

In the drawing, the active chromatographic layer 2 is firmly bonded to the thin rod support 1. The inorganic adsorbent particles 3 are contained within glass binder 4, the particles of the latter adhering to one another, to the adsorbent particles and to the thin rod support.

According to the present invention, there is provided a chromatographic element for use in stick chromatography or rod TLC which comprises; a thin rod of refractory and chemically-stable materials and a porous sintered layer of finely divided or powdered glass containing fine particles of a chromatographically-active inorganic adsorbent within the porous structure of powdered glass, said layer being bonded firmly to said thin rod: and a method for producing the chromatographic element which comprises; mixing finely divided or powdered glass with fine particles of inorganic adsorbent, kneading the mixture with a small amount of slurrying agent to obtain a slurry, applying said slurry on the surface of a thin rod of refractory and chemically-stable materials, and baking the applied thin rod at a temperature around the temperature at which the glass begins to melt until the glass becomes sticky and the particles thereof adhere to one another, to the adsorbent particles, and to the thin rod support.

The material comprising the thin rod includes various glasses, quartz, ceramic materials and metals, and if the element is solely used in the ordinary developing operation, any glass materials and metals may preferably be used as the rod. If a metal is used, it should be as chemically-stable as possible; for instance, titanium, tantalum, stainless steel or platinum is preferably used but aluminum, copper or iron can also be used so long as the metal is not affected by the sample to be developed or the developing solvent. Of course, alloys of these metals may be advantageously employed.

Such material is finished as a thin rod having a diameter of about 0.5 mm to about 5 mm before the coating process. If the diameter is above 1 mm, a hollow rod, i.e., a tubular body may also be used. When the element is subjected to the FID process, a thin rod of 0.5–0.8 mm diameter and of particularly refractory material such as quartz is preferred. Although the length of the rod is not significant, usually a length of about 15 cm is preferred for convenience of handling.

The finely divided or powdered glass can be obtained by crushing soda-lime glass, borosilicate glass, high silicate glass, crystallized glass or lead silicate glass in a conventional ball mill, and by elutriating and sieving the crushed product. Any mixture of the crushed products of said glass materials can also be used. The particle size of the powdered glass can range from about 1 $\mu$ to 40 $\mu$, i.e., even granules of 325–500 mesh, which are about the same size (about 1 to 10 $\mu$) as the adsorbent particles. These are selected by their adhesive properties and by their particle sizes to meet the intended purpose of use. If the element is subjected to the flame of the high temperature of the FID process, a powder of crystallized glass, Devitroceramics, which are commercially available under the trade name, for instance, "Heatron," (Fuji Photo Film Corporation), "Pyroceram" (Corning Glass Works) or the like, is preferred.

As the inorganic adsorbent, there can be exemplified silica gel, alumina, diatomaceous earth, magnesium silicate, porous glass powder and the like or a mixture thereof. These are used after granulation to particle sizes most suitable for the intended purposes. Most of the commercially available adsorbents for thin-layer chromatography can advantageously be used as such for the purpose of the present invention, except, for instance, cellulose which has a poor heat resistance.

Said finely divided or powdered glass is usually mixed with the finely particulate adsorbent at a weight ratio of from about 1:1 to 30:1, preferably from about 2:1 to 10:1. Where the ratio of the adsorbent to the powdered glass is greater than 1, the binding force of the particles constituting the layer is insufficient. On the other hand, a ratio less than 1:30 is not suitable because it leads to incomplete development of the chromatogram. Typically, a weight of adsorbent of about 10 percent to about 30 percent of the weight of the whole mixture produces advantageous results, although other ranges may be useful for particular combinations of adsorbent and developing solvent.

Although there is a tendency of raising the Rf value of the thin-layer when it is developed in the same developing solvent with a larger proportion of the finely divided or powdered glass, the Rf value can be adjusted by lowering the polarity of the developing solvent. Therefore, compounds of high polarity, which have hitherto been difficult to chromatograph, can be separated if a stick having a thin-layer wherein the activity of the adsorbent used has been adjusted by determining said mixing ratio in accordance with the polarity of the compound to be detected is employed. This is one of the unexpected advantages derived from the present invention.

According to the present invention, said mixture of the finely divided or powdered glass and the finely particulate adsorbent is kneaded after adding a small amount of a slurrying agent thereto which is preferably a volatile solvent including water, benzene, alcohols, ketones or any mixture thereof. The slurrying agent serves for the homogenization of the mixture and gives the slurry a suitable consistency and an adhering property to the thin rod. The desired property of the slurrying agent is to hold the shape of the thin-layer undisturbed until the baking operation; acetone and ethanol are particularly suited for this purpose.

Other auxiliary binding agents may optionally be added to said mixture as long as they can be completely removed by incineration or vaporization and they do not produce any residue after baking. Such an addition may give said slurry a suitable solidity, consistency, or viscosity for the preparative process. Canada balsam, for example, having a strong adhesive property, can preferably be added to said mixture, because it fulfils said various requirements and because the benzene used as its solvent has good volatility.

An aqueous solution of starch may also be used as the additive, but such an organic material sometimes stains or chars the sintered layer due to its carbonization or its residual ashes. Similarly, polyvinyl alcohol, polyacrylamide, nitro- or acetylcellulose, and the like are suitable in some cases. Where the sample to be chromatographed does not form an insoluble sulfate or a calcium salt, gypsum can be added without substantial difficulty, and in such a case, a relatively thick layer, up to about 2 mm, can be formed successfully.

However, the addition of such an auxiliary binding agent is not essential; indeed, any volatile solvent, including water, can solely be used in the kneading step. When water is used, infrared irradiation is very effective for the rapid evaporation of remaining water.

The thin rod is then dipped in the slurry and pulled up immediately, which coated rod is thereafter dried and baked preferably in a clean environment, for instance, in an electric furnace, at a temperature which is slightly higher than the point where the used glass powder begins to melt for a period of time sufficient for the sintering.

This temperature (softening point) of the glass, of course, varies with the physical properties of the glass materials used, and usually ranges from about 570°C for lead silicate glass up to about 900°C for crystallized glass. The period of time sufficient for the sintering is from about 3 to 10 minutes. If the temperature is too high, the whole layer melts and is destroyed, while if it is too low, no sintered layer is formed. Said temperature and time must suitably be controlled so that the baking is sufficiently performed until the glass becomes sticky and the particles thereof adhere to one another, to the particles of the adsorbent and to the thin rod support.

The baked thin rod is cooled gradually to remove strains caused by the heating among the component particles and that between the particles and the core rod by annealing. This gradual cooling may be omitted when quartz or high silicate glass is employed as the core rod. Regardless of the fact that there is approximately a ten fold difference between the thermal expansion coefficient of the glass and that of the adsorbent (for instance, the expansion coefficient of soda-lime glass is about $9.2 \times 10^{-6}$, while that of silica gel is about $5.4 \times 10^{-7}$), the particles form firm and mutually melted bondings. This phenomenon is most unexpected and is believed to result from the fact that the sintered layer of the fine particles of glass which covers the surface of the thin rod has sponge-like spaces of continuous cavities and channels, and the adsorbent particles are held or embraced within said spaces without being densely packed together.

This hypothesis can be supported by a scanning electromicroscopic photograph of the sample sintered layer by which it is appreciated that the adsorbent particles are embraced or held while retaining their porous structure. It is also attributable to the fact that the chromatographic activity of the adsorbent is sufficiently retained even after the sintering or baking. Should the sintered-layer be such that the adsorbent particles are fully covered by the molten glass, the expected activity of adsorbent would presumably be lost.

The thickness of the thin-layer covering the core rod is in a range between about $10\ \mu$ and $200\ \mu$, measured by a micrometer or a thickness gauge. This thickness can be adjusted by the ratios of incorporation of the slurrying agent and an auxiliary binding agent into the slurry.

DESCRIPTION OF THE PREFERRED EMBODIMENTS

In the following paragraphs, preferred embodiments of the present invention will be described in detail by way of examples.

EXAMPLES 1 THROUGH 11

In each Example, quartz, high silicate glass, borosilicate glass or stainless steel is selected as the material of the supporting thin rod, which is finished as a rod having a diameter of about 0.5–1 mm or a pipe having an outside diameter of about 1–4 mm and a length of about 15 cm. The slurry used is a suspension (1:1.4, w/v) of a mixture (1.4, w/w) of the respective adsorbent and fine particles of soda-lime glass (mean diameter, about 1–10 $\mu$) in acetone. The above thin rod is dipped in the slurry and pulled up to dry the acetone with aeration. The sintering is performed in an electric furnace at 670°–680°C for about 6–7 minutes.

The sintered thin rod thus obtained can be recovered for regeneration after the developing experiments unless the adsorbent in the thin-layer is deactivated or deteriorated by heating at the high temperature of the hydrogen flame of the FID process. In the Examples, repeated developing experiments are carried out in order to confirm the reproducibility of the separation with the same rod with azo dyes, estrogens, lipids and alkaloids. As a result of the experiments, it is noted that the standard deviation ($\sigma$) of the hRf (the hundredth of Rf) lies within the hRf value $\pm 4$.

In the following, the details of conditions and methods employed are summarized in Table 1.

TABLE I

Conditions of manufacturing the sintered thin rods and development, and method of detection and regeneration

| Examples, numbered as. | 1 | 2 | 3 | 4 | 5 | 6 | 7 | 8 | 9 | 10 | 11 |
|---|---|---|---|---|---|---|---|---|---|---|---|
| Adsorbent | Silica gel[1] | | | | | | | | Alumina[2] | Alumina | Silica gel. |
| Thickness of the thin layer. | 50 | 25 | 20 | 170 | 150 | 15 | 115 | 60 | 170 | 106 | 50. |
| Thin rod: | | | | | | | | | | | |
| Material | | Quartz | | High silicate glass[3] | Borosilicate glass[4] | | | Quartz | Borosilicate glass | | Stainless steel. |
| Diameter (mm.) | 0.9 | 4.0 | 0.8 | 2.5 | 2.7 | 0.72 | 4.0 | 0.6 | 2.5 | 2.0 | 0.49. |
| Substances to be separated | Azo dyes[5] | Estrogens[6] | Lipids[7] | | Azo dyes I[5] | | Azo dyes II[8] | Azo dyes II[8] | Estrogens[6] | Alkaloids[9] | Azo dyes I.[5] |
| Development: | | | | | | | | | | | |
| Solvent | Benzene | Benzene, ethyl acetate (2:1). | n-Hexane, ethyl ether, acetic acid (180:30:1). | | Benzene | | Carbon tetrachloride | | Benzene, ethyl acetate (2:1). | Benzene, chloroform, diethylamine (36:8:1). | Benzene. |
| Time (minutes) in distance of 10 cm. | 20 | 16 | 14 | 20 | 15 | 15 | 25 | 22 | 24 | 15 | 15. |
| Method of detection | Visual | Coloration with iodine vapor or conc. sulfuric acid. | Coloration with iodine vapor or sulfuric acid-dichromate. | | | Visual | | | Coloration with iodine vapor or conc. sulfuric acid. | Coloration with iodine vapor or Dragendorf reagent. | Visual. |
| Method of recovery | Soaking in chloroform. | | Soaking in sulfuric acid-dichromate | | Soaking in chloroform | | | | Soaking in sulfuric acid-dichromate | | Soaking in chloroform. |

[1] Silica gel: Merck, Silica Gel H.
[2] Alumina: Merck, Aluminum Oxide neutral (Type T).
[3] High silicate glass: Corning Glass Works, "Vycor".
[4] Borosilicate glass: Corning Glass Works, "Pyrex".
[5] Azo dyes I: A mixture of Indophenol (IP), Sudan red G (SRG) and Butter yellow (BY).
[6] Estrogens: A mixture of Estriol (E$_3$), Estradiol (E$_2$) and Estrone (E$_1$).
[7] Lipids: A mixture of Palmitic acid (P), Methyl oleate (MO), and Cholesteryl stearate (CS).
[8] Azo dyes II: A mixture of Para-aminobenzene (PAB), Sudan yellow (SY) and Azobenzene (AB).
[9] Alkaloids: A mixture of Quinine (Q), Burucine (B) and Thebaine (T).

The results of developing experiments repeatedly ($n = 5$) carried out and expressed in terms of $hRf$ on each sintered thin rod prepared in accordance with the tabulated methods are summarized in Tables 2–12 as follows, wherein $\bar{x}$ are mean values of hRf:

Table 2: Example 1

| n | IP | SRG | BY |
|---|----|-----|----|
| 1 | 16 | 30  | 61 |
| 2 | 16 | 34  | 65 |
| 3 | 16 | 32  | 64 |
| 4 | 16 | 33  | 65 |
| 5 | 16 | 32  | 64 |
| $\bar{x}$ | 16 | 32 | 64 |
| $\sigma$ | 0 | 1.5 | 1.7 |

Table 3: Example 2

| n | $E_3$ | $E_2$ | $E_1$ |
|---|-------|-------|-------|
| 1 | 15 | 59 | 72 |
| 2 | 15 | 61 | 72 |
| 3 | 15 | 60 | 72 |
| 4 | 15 | 60 | 72 |
| 5 | 15 | 60 | 72 |
| $\bar{x}$ | 15 | 60 | 72 |
| $\sigma$ | 0 | 0.8 | 0 |

Table 4: Example 3

| n | P | MO | CS |
|---|----|----|----|
| 1 | 26 | 74 | 89 |
| 2 | 23 | 73 | 85 |
| 3 | 22 | 70 | 86 |
| 4 | 21 | 73 | 85 |
| 5 | 23 | 72 | 84 |
| $\bar{x}$ | 23 | 72 | 86 |
| $\sigma$ | 1.9 | 1.6 | 1.9 |

Table 5: Example 4

| n | IP | SRG | BY |
|---|----|-----|----|
| 1 | 22 | 32 | 59 |
| 2 | 20 | 30 | 57 |
| 3 | 21 | 35 | 61 |
| 4 | 23 | 34 | 62 |
| 5 | 25 | 36 | 62 |
| $\bar{x}$ | 22 | 33 | 60 |
| $\sigma$ | 1.9 | 2.5 | 2.1 |

Table 6: Example 5

| n | IP | SRG | BY |
|---|----|-----|----|
| 1 | 15 | 26 | 57 |
| 2 | 16 | 28 | 55 |
| 3 | 15 | 30 | 56 |
| 4 | 15 | 30 | 56 |
| 5 | 15 | 30 | 57 |
| $\bar{x}$ | 15 | 29 | 56 |
| $\sigma$ | 0.5 | 1.8 | 0.9 |

Table 7: Example 6

| n | IP | SRG | BY |
|---|----|-----|----|
| 1 | 15 | 28 | 53 |
| 2 | 15 | 30 | 55 |
| 3 | 15 | 30 | 56 |
| 4 | 15 | 28 | 54 |
| 5 | 16 | 30 | 56 |
| $\bar{x}$ | 15 | 28 | 55 |
| $\sigma$ | 1.0 | 1.1 | 2.3 |

Table 8: Example 7

| n | PAB | SY | AB |
|---|-----|----|----|
| 1 | 20 | 61 | 90 |
| 2 | 20 | 62 | 91 |
| 3 | 21 | 62 | 90 |
| 4 | 21 | 62 | 91 |
| 5 | 20 | 60 | 88 |
| $\bar{x}$ | 21 | 61 | 90 |
| $\sigma$ | 0.9 | 1.0 | 1.2 |

Table 9: Example 8

| n | PAB | SY | AB |
|---|-----|----|----|
| 1 | 32 | 61 | 83 |
| 2 | 35 | 63 | 85 |
| 3 | 35 | 70 | 85 |
| 4 | 35 | 65 | 88 |
| 5 | 37 | 65 | 89 |
| $\bar{x}$ | 35 | 65 | 86 |
| $\sigma$ | 1.9 | 3.3 | 2.4 |

Table 10: Example 9

| n | $E_3$ | $E_2$ | $E_1$ |
|---|-------|-------|-------|
| 1 | 17 | 61 | 78 |
| 2 | 17 | 68 | 79 |
| 3 | 17 | 67 | 78 |
| 4 | 15 | 64 | 75 |
| 5 | 15 | 64 | 77 |
| $\bar{x}$ | 16 | 65 | 77 |
| $\sigma$ | 1.1 | 2.8 | 1.6 |

Table 11: Example 10

| n | Q | B | T |
|---|----|----|----|
| 1 | 37 | 53 | 74 |
| 2 | 40 | 55 | 72 |
| 3 | 40 | 55 | 78 |
| 4 | 35 | 48 | 69 |
| 5 | 40 | 52 | 78 |
| $\bar{x}$ | 38 | 53 | 74 |
| $\sigma$ | 2.3 | 2.9 | 4.0 |

Table 12: Example 11

| n | IP | SRG | BY |
|---|----|-----|----|
| 1 | 15 | 31 | 52 |
| 2 | 15 | 31 | 50 |
| 3 | 16 | 31 | 50 |
| 4 | 18 | 31 | 50 |
| 5 | 16 | 30 | 51 |
| $\bar{x}$ | 18 | 31 | 51 |
| $\sigma$ | 2.0 | 1.7 | 1.0 |

COMPARATIVE PREPARATION

A slurry including silica gel adsorbent of the above examples is applied on a quartz plate (5 × 20 cm; thickness, 1 mm) and baked in an electric furnace at 670°–680°C for about 3–4 minutes after being dried, to obtain a sintered plate. This plate is used in a development test of the Azo dye mixture of Examples 1, 4, 5, 6 and 11 and that of the Estrogens mixture of Examples 2 and 9, in a conventional manner.

The results of the development tests are as follows;

hRf values of Azo dyes 1

| n | IP | SRG | BY |
|---|----|-----|----|
| 1 | 14 | 31 | 60 |
| 2 | 16 | 31 | 60 |
| 3 | 16 | 33 | 61 |
| 4 | 16 | 33 | 62 |
| 5 | 16 | 32 | 62 |
| $\bar{x}$ | 16 | 32 | 61 |
| $\sigma$ | 1.0 | 1.0 | 1.0 | hRf values of Estrogens

| n | $E_3$ | $E_2$ | $E_1$ |
|---|-------|-------|-------|
| 1 | 14 | 63 | 74 |
| 2 | 13 | 64 | 76 |
| 3 | 13 | 65 | 76 |
| 4 | 14 | 63 | 72 |
| 5 | 15 | 63 | 74 |
| $\bar{x}$ | 14 | 64 | 74 |
| $\sigma$ | 0.9 | 1.0 | 1.7 |

Solvent: Benzene – Ethyl acetate (2:1)
Time (10 cm): 16 min; 16 min
Detection: Visual; Coloration with conc. sulfuric acid.

The results are compared with those of Examples 1 and 2 of;

| $\bar{x}$ | 16 | 32 | 64 |
|-----------|----|----|----|
| $\sigma$ | 0 | 1.5 | 1.7 |

| $\bar{x}$ | 15 | 60 | 72 |
|-----------|----|----|----|
| $\sigma$ | 0 | 0.8 | 0 |

In this manner, the existence of a strong correlation between the Rf values is confirmed in that, the Rf values of the each developed substance on the TLC rod of the examples approximates those of the TLC plate of the comparative preparation.

EXAMPLE 12

A. Preparation of Sintered Sticks

Chromatographic sticks of silica gel adsorbent are prepared in a manner substantially analogous to the previously described examples. In this example, however, quartz rods of about 0.3–0.9 mm diameter and about 15 cm length, and a fine powder of crystallized glass, which is available from Fuji Photo Film Corporation under the trade name "Heatron P," are used.

The mixing ratio of the adsorbent (Merck: Silica Gel H) to the powdered glass is about 1:4 (adsorbent 25 percent, w/w) and the mixture is suspended in acetone to obtain a slurry (1:1.6, w/v). The thickness of the sintered layer measured after baking the applied stick at about 900°C for about 10 minutes, is about 100 $\mu$.

B. Ascending Development of a Standard Lipid

1) Standard Lipid Mixture:
Free Cholesterole (F C)  5 $\mu g/\mu l$  in Methanol-
Tryglyceride (T G)  do.  Chloroform
Cholesteryl Ester (C E)  do.  (2:3)

2) Developing Solvent:
Hexane-Ethylether-acetic acid (180:30:1)
3) Distance: 10 cm
4) Time: 20 minutes
5) Results of repeated development (n=5)

| hRf | F C | T G | C E |
|-----|-----|-----|-----|
| $x$ | 30 | 71 | 84 |
| $\sigma$ | ±2 | ±3 | ±3 |

C. Quantitative Determination by TLC-FID Method

1. Equipment employed:
Iatron "Synchrograph TFG-10"
(A Hydrogen Flame Ionization Autodetector, available from Iatron Laboratories, Inc. Tokyo)

2. Method:
In accordance with the above method (B), chromatograms on the sticks are obtained with varying amounts of the spotted sample. They are processed by synchrograph repeatedly to obtain a calibration curve which indicates the relationship between the amount of sample spotted and the peak area of the Synchrogram.
The minimum amount of the sample discernible by this calibration curve is about 2–3 $\mu$g for each sample (FC, TG and CE).
The error in the value determined by this method is about ±5 percent (C. V., Coefficient of variation).

The invention being thus described, it will be obvious that the same may be varied in many ways. Such variations are not to be construed as a departure from the spirit and scope of the invention, and all such modifications are intended to be included within the scope of the following claims.

We claim:

1. A chromatographic element for use in stick chromatography or rod thin-layer chromatography which consists essentially of a thin rod of refractory and chemically stable materials and a porous sintered layer of finely divided or powdered glass containing fine particles of a chromatographically active inorganic adsorbent within the porous structure of powdered glass, the particles of said sintered layer being adhered to one another, to the adsorbent particles and to the thin rod support.

2. A chromatographic element is claimed in claim 1, wherein said finely divided or powdered glass is selected from the group consisting of soda-lime glass, borosilicate glass, lead silicate glass, high silicate glass, crystallized glass and mixtures thereof.

3. A chromatographic element as claimed in claim 1, wherein said adsorbent is selected from the group consisting of silica gel, alumina, diatomaceous earth, magnesium silicate, porous glass powder and mixtures thereof.

4. A chromatographic element as claimed in claim 1, wherein said thin rod of refractory and chemically-stable materials is a rod or tubular body of a material selected from the group consisting of quartz, high silicate glass, borosilicate glass, ceramic materials, titanium, tantalum, stainless steel, platinum, aluminum, copper, iron and alloys of said metals.

* * * * *